United States Patent [19]

Niwa

[11] Patent Number: 5,734,573
[45] Date of Patent: Mar. 31, 1998

[54] NUMERICAL CONTROL UNIT WITH POSITION COUNTER CONTROL AND DISPLAY

[75] Inventor: Tomomitsu Niwa, Aichi, Japan

[73] Assignee: Mitsubishi Denki Kabushiki Kaisha, Tokyo, Japan

[21] Appl. No.: 698,139

[22] Filed: Aug. 15, 1996

Related U.S. Application Data

[63] Continuation of Ser. No. 908,316, Jul. 2, 1992, abandoned.

[30] Foreign Application Priority Data

Jul. 4, 1991 [JP] Japan .................................. 3-164440

[51] Int. Cl.[6] ...................................................... G06F 19/00
[52] U.S. Cl. .............................. 364/474.2; 364/474.36; 364/474.27
[58] Field of Search ..................... 364/474.36, 474.2, 364/474.04, 474.22–474.27

[56] References Cited

U.S. PATENT DOCUMENTS

| | | | |
|---|---|---|---|
| 4,115,859 | 9/1978 | Brisk et al. | 364/476 |
| 4,513,366 | 4/1985 | Munekata et al. | 364/474.2 |
| 4,862,381 | 8/1989 | Shibata | 364/474.36 |
| 4,994,977 | 2/1991 | Tsujido | 364/474.2 |
| 5,051,912 | 9/1991 | Johanson et al. | 364/474.04 |

FOREIGN PATENT DOCUMENTS

| | | |
|---|---|---|
| 0328750 | 11/1988 | European Pat. Off. . |
| 0386271 | 9/1989 | European Pat. Off. . |
| 3931762 | 8/1989 | Germany . |
| 62099050 | 10/1985 | Japan . |
| 60-220470 | 11/1985 | Japan . |
| 2069889 | 2/1981 | United Kingdom . |

OTHER PUBLICATIONS

Robotersysteme, vol. 6, No. 2, Jun. 1990, Berlin DE, pp. 199–125, K. Hömann & V. Werling.

Robotersysteme, vol. 5, No. 1, Mar. 1989, Berlin DE, pp. 9–16, M. Wadle & M. Cramer.

Patent Abstract of Japan, vol. 51, No. M078, 14 Jul. 1981.

*Primary Examiner*—James P. Trammell
*Attorney, Agent, or Firm*—Sughrue, Mion Zinn, Macpeak & Seas, PLLC

[57] ABSTRACT

A numerical control machine movement detection and determination apparatus in which the movement of the machine within one coordinate system is detected and stored, the stored values being operated on by selectable operational expressions in order to generate values within a second coordinate system. The values in the second coordinate system are used as the basis for a display to the operator or for a determination of an interference condition. The operation expressions may be selected from arithmetic expressions or functions that best present the machine movement to an operator in display form or best provide an efficient basis for determining the existence of an interference condition.

27 Claims, 19 Drawing Sheets

FIG. 2B

| DY \ DX | DX<0 | DX=0 | DX>0 |
|---|---|---|---|
| DY<0 | $\theta + 180°$ | 270° | $\theta + 360°$ |
| DY=0 | 180° | 0° | 0° |
| DY>0 | $\theta + 180°$ | 90° | $\theta$ |

NOTE: $\theta = TAN^{-1} \frac{DY}{DX}$ ($-90° < \theta < 90°$)

FIG. 4

COUNTER CONTROLLING COMMANDS $ C1=R, SQR(N32+N42)
$ C2=0, ATAN(N3/N4)
$ C6=CHKX1, N5-200000
$ C7=CHKZ1, 500000-N6
$ C8=CHKT1, N5-2*N6-800000
$ CK=(C6 AND C7) OR (C8 AND -C7)
$ DISPLAY C1, C2, SET
$ COUNT C1, C2, C6, C7, C8 SET
$ COUNT ON
$ DISPLAY ON
$ CHECK ON

MACHINING PROGRAM

...

...

80

NUMERICAL CONTROL UNIT WITH POSITION COUNTER CONTROL AND DISPLAY

This is a Continuation of Application Ser. No. 07/908, 316 filed Jul. 2, 1992, now abandoned.

BACKGROUND OF THE INVENTION

1. Field of the Invention

The present invention relates to a numerically controlled machine tool and specifically to the counter control of a numerical control unit.

2. Description of the Background Art

A numerical control unit is designed to perform numerical control processing on the basis of commands in a machining program written on paper tape or the like and to drive a machine tool in accordance with the results of that processing, thereby machining a workpiece according to the commands.

FIG. 11 is a block diagram of a numerical control unit known in the art. A machining program read from a tape reader 11 is stored into a memory 12. When executed, the machining program is read block by block from the memory 12 and first processed by a controller 17 containing a central processing unit (CPU), a control program memory, and other conventional components. The controller 17 then performs numerical control processing in accordance with the machining program, driving the servo motor of a machine tool 1 to move a table or a turret according to a move command or carrying out control, e.g., Machine Tool 1 Coolant ON/OFF, Spindle Forward Rotation/Reverse, Rotation/Stop, and the like, via a control box 13. The numeral 16 indicates a control switch panel holding controls for providing zeroing, jog and other commands, 14 a manual data input device (referred to as the "MDI") employed to manually enter various data to the controller 17, and 15 a display unit for displaying the current position and other data of the machine. The devices 11 to 17 comprise a computer numerical control unit (referred to as the "CNC"). Including the CPU, control program memory, and other conventional components, as described above, the controller 17 in the CNC performs predetermined numerical control processing on the basis of the control program and machining program, thereby controlling the machine tool 1.

In general, an operator handling the machine tool knows a tool position according to counter values displayed on a CRT screen 41 of the display unit 15 of the CNC as shown in FIG. 13 and checks whether proper machining is carried out or not. Namely, the counter values displayed on the CRT screen 41 are very significant to the operator in carrying out machining.

Referring to FIG. 13, a counter represented by:

<ABSOLUTE> indicates the current position of the tool in an absolute coordinate system. The absolute system is set up by the user as a standard reference point for all machining activity. In FIG. 13, X-axis and Z-axis values are displayed.

Referring again to FIG. 13, a counter represented by:

<RELATIVE> indicates the current position of the tool in a relative coordinate system. In FIG. 13, X-axis and Z-axis values also are displayed. A relative reference point can be set up by an operator anywhere on the Workpiece and is established relative to the absolute reference point. Often it is easier for the operator to have separate reference points for each machining operation on a single work product.

A counter represented by:

<MACHINE> indicates the current position of the tool in a machine coordinate system. The machine reference point is the starting point of the machine when power is first turned on. The center of such coordinate system often is at the center of the machine table. This is a pertinent system for the machine but may not be useable efficiently by the operator for control of a particular machining operation.

A counter represented by:

<DIST TO GO> indicates the remaining distance that a tool must travel along each axis for a given block. This value is based on present tool position.

All of these counters are updated serially as the tool moves.

FIG. 12 is a block diagram of major parts illustrating a general sequence of counter processing known in the art. In a program run mode, the machining program stored in the memory 12 is read on a block basis and is processed by a machining program analysis processor 21, where the move command of each axis is extracted. In a manual operation mode, the move command of the axis associated with the jog switch is extracted by pressing the jog switch or the like on the control switch panel 16. These axis move commands are processed by a pulse distribution processor 22 which then transmits them to a servo controller 5 as axis move command pulses. On the basis of this data, the servo controller 5 provides a rotation command to a servo motor 6 installed on the machine tool 1. The rotation of the servo motor 6 is detected by a detector 7 whose output detection pulses are fed back to the servo controller 5, thereby forming a servo loop. The axis move command pulses fed by the pulse distribution processor 22 to the servo controller 5 are added to the CNC counters 30, whereby the counter values are updated. The counter displays are provided by displaying the CNC counter 30 values on the display unit 15. These counter values at any given time are the accumulations of axis travel values as the tool is moved by the axis move commands. By resetting (clearing) the counter values to zero at a certain point or setting particular values in the counter displays, relative travel values or the like from that point can be displayed.

Concerning the counter displays, there are conventional designs such as those taught in Japanese Patent Disclosure Publication No. 52152 of 1981 or Japanese Patent Disclosure Publication No. 99059 of 1987 which cause the actual position of a tool nose to be displayed by shifting the counter values by so-called "tool position offset" values.

As shown in FIG. 16, the amount that a tool can actually move is limited due to the structure of the machine tool 1 and the structure of the machine tool supports 8. If this limit is exceeded, the tool and/or its auxiliary structures are likely to interfere with other machine tool structures. To prevent the tool from moving beyond the end of each axis of the machine tool 1, a limit switch 9 is provided at the end of each axis of the machine tool 1. The amount that the tool can move as restricted by the limit switches 9 is referred to as a movable area 58. In addition, a region the tool cannot enter, as may be required for a particular machining operation, may be defined within the movable area 58. This is illustrated as no-entry area 59.

A plurality of such no-entry areas 59 may be defined as shown in FIG. 17, each of the no-entry areas 59 being defined by specifying the coordinate values of two opposing vertices A and B in parameters set in the machining program or CNC, as shown in FIG. 18.

During a machining operation, CNC checks the counter values to see if the tool has advanced toward any of these no-entry areas 59. If the tool attempts to advance into the no-entry area 59, as shown by the machining locus between starting point S and ending point E in FIGS. 19A or 19B, the CNC stops the tool at point a immediately before the tool enters area 59 and displays an alarm on the CRT screen 41 of the display unit 15.

An alternative interference check is shown in FIG. 20 wherein, whether or not a tool area 62 interferes with a chuck area 61 and/or a tailstock area 63 is checked. With data defining the scope of each area pre-stored in the internal memory of the CNC 7, whether the areas interfere with each other or not is checked every time the tool moves. In this system, the shape of the areas to be checked is generally simplified because, if the actual shape is complex, an excessive amount of time is required to make an interference check judgement.

In accordance with a use of the aforementioned functions, the CNC counter displays known in the art only provide the coordinate values of each axis.

FIGS. 14A and 14B are machining diagrams used for machining six tapped holes 43 in a material 42 on a machining center. The numeral 44 indicates machining on an X-Y plane and 45 machining on an X-Z plane. In this case, the tapped holes 43 are machined at equal distances from the center on a 50 mm-diameter circumference, each spaced 60 degrees from the other with respect to the center. In this tapping operation, the reference point is the center of a circle but the CNC counters only display X and Y coordinate values. Therefore, whether the tapped holes 43 have been machined at intervals of 60 degrees or not is unknown from only the X and Y values, unless a calculation is made from the X and Y coordinate values. This would require the operator to stop the machining and perform calculations to determine the center of each hole and its size in order to make certain that the tool is in the proper place. The display cannot show in real time as machining occurs where a hole is located from the center of the circle, based on radius and angle values, in a manner that would be understood by the operator.

Similarly, FIGS. 15A and 15B are machining diagrams used for machining a pocket area 47 in a-material 46 on a machining center. The numeral 48 indicates machining on an X-Y plane and 49 machining on an X-Z plane. The area 47 is machined at 20 degrees to the X-Y coordinates. Also in this machining, the CNC counters only display X and Y coordinate values. Hence, whether or not the machining has been carried out in accordance with the drawing, i.e., 30 mm widths have been cut as shown in FIG. 15A, is unknown unless calculation is made from the X and Y coordinate values.

FIG. 21 illustrates how a lathe turret 50 accommodates tools 51. Since the tools 51 are installed in close proximity to each other on the turret 50 as shown, the other tools than the one being employed to machine a workpiece may interfere with the workpiece, chuck or tailstock. Hence, an interference check is insufficient if it is only performed on the tool being used to machine the workpiece.

FIG. 22 shows a turning operation, wherein a workpiece 54 is gripped by a chuck 55 and the workpiece is being turned by a tool 52 installed on the turret 50. In this case, a tool 53 (other than the tool 52 being used for turning) may hazardously interfere with a wall 56 on the chuck side. As described above, a complete interference check is extremely complicated and is also difficult in terms of processing time.

SUMMARY OF THE INVENTION

It is, accordingly, an object of the present invention to overcome the disadvantages in the conventional approach by providing a CNC which provides the operator appropriate counter displays to allow the operator to check machining results easily.

It is another object of the present invention to provide a CNC which allows an interference check to be performed in shorter processing time and reliably by making an interference check at the most appropriate portion according to the machining operation to be performed.

These and other objects are accomplished by providing operation expressions that are operative to convert the conventional axial count values in an orthogonal reference system into movement values in a more pertinent reference system.

The present invention applies selected operation expressions to the axial count values and generates movement values that may be stored for purposes of display to an operator in an understandable form.

The present invention also uses the stored movement values to determine possible interference with other machining structures which are represented accurately in the same reference system.

The operational expressions used in the present invention may be entered manually, under program control or may be automatically generated.

BRIEF DESCRIPTION OF THE DRAWINGS

FIG. 4 gives a machining program description example relating to an embodiment of the present invention.

DESCRIPTION OF THE PREFERRED EMBODIMENTS

Figure 1:
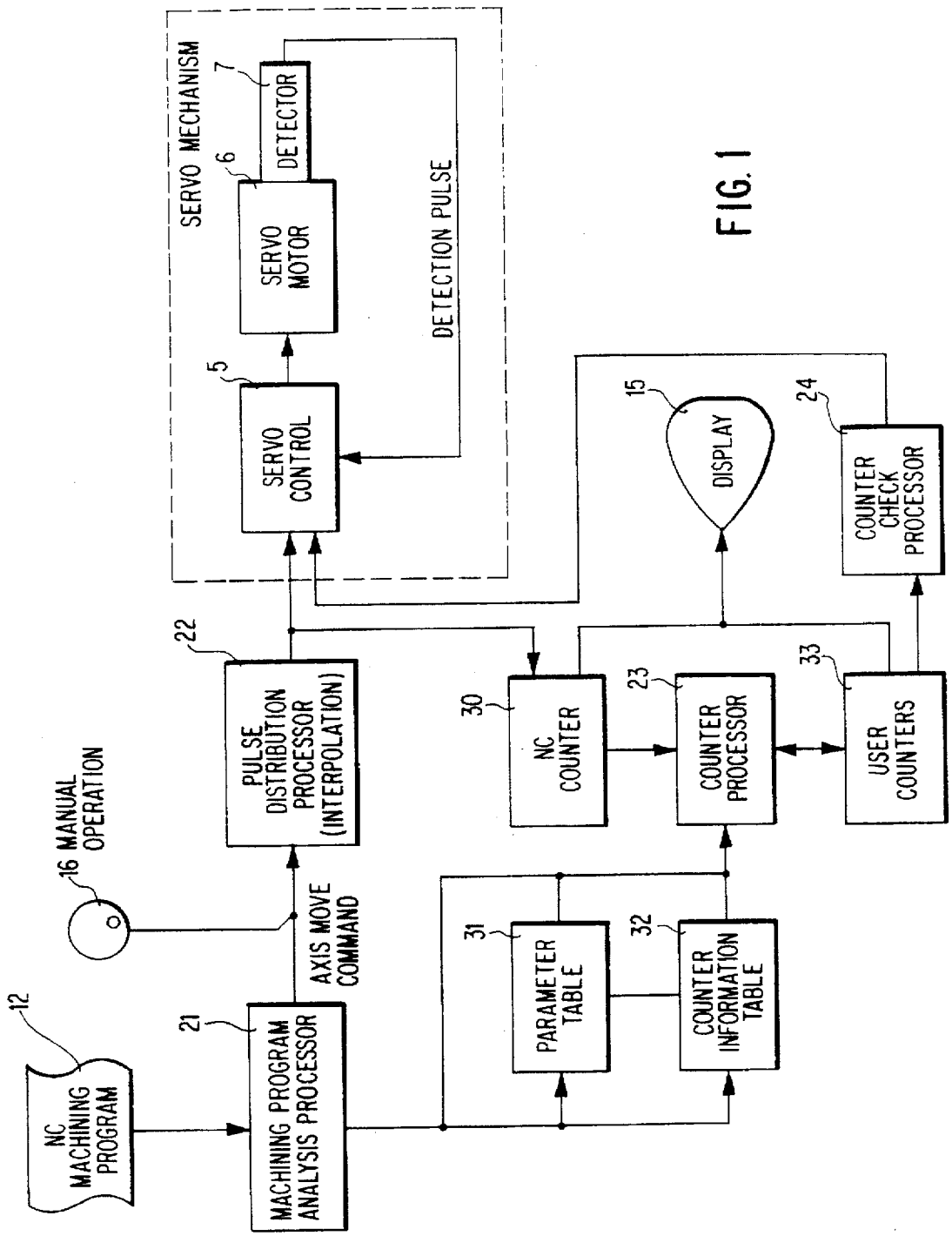
FIG. 1 is a block diagram illustrating the main components of a NC machining apparatus relating to an embodiment of the present invention.
Figure 12:
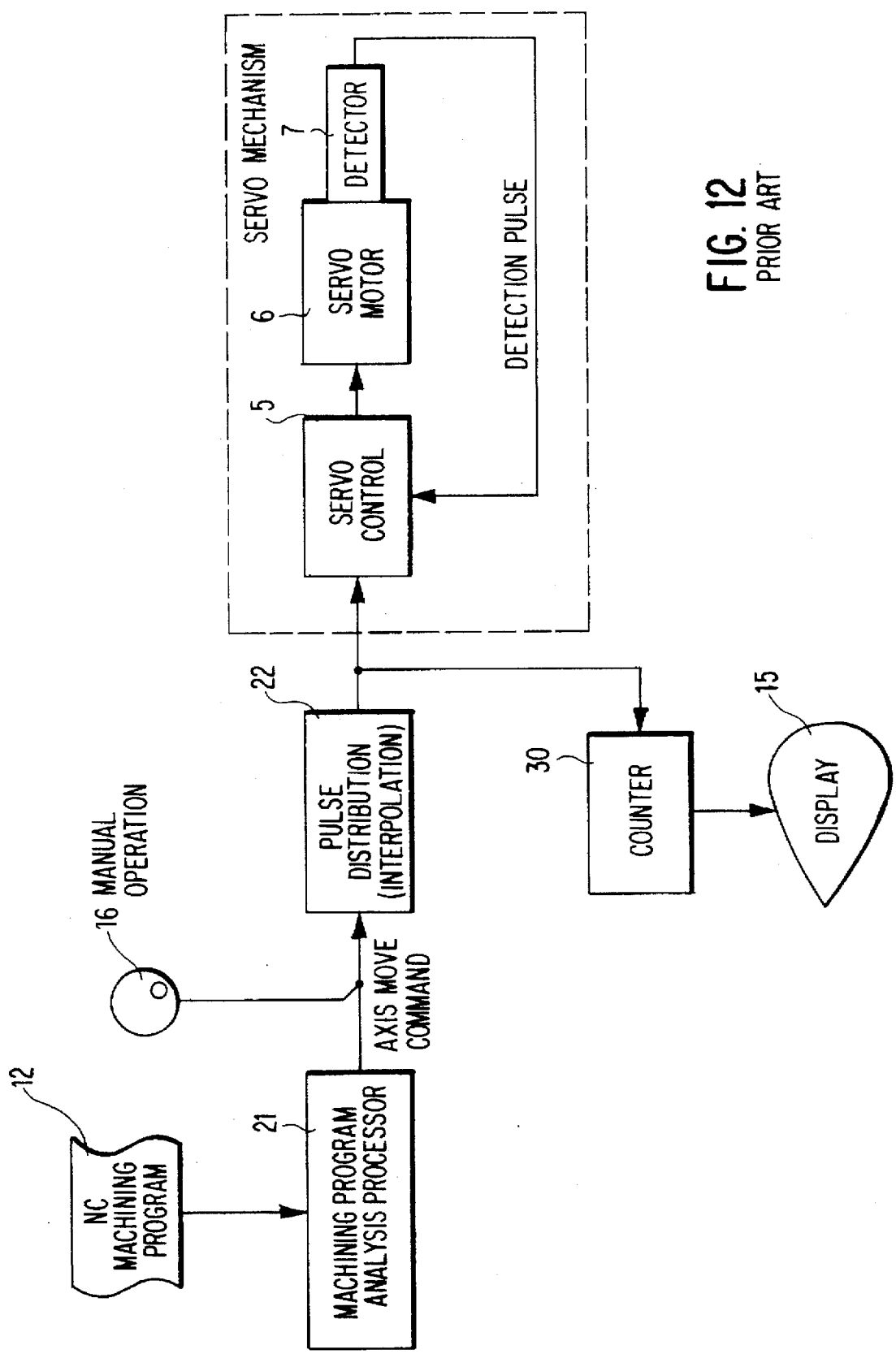
FIG. 12 is a block diagram illustrating certain components of a numerical control unit known in the art.

An embodiment of the present invention will now be described in relation to the appended drawings. FIG. 1 is a block diagram illustrating the major components of a NC machine containing a CNC counter processing concerned with the present invention. As compared to the known counter processing shown in FIG. 12, the present embodiment features the addition of a counter processor 23, a counter check processor 24, a parameter table 31, a counter information table 32 and user counters 33.

As in the conventional counter processing, the counter values indicating the present position of a tool are stored into NC counters 30. The counter values are applied to operation expressions stored in the counter information table 32 and the results are stored into the user counters 33. In performing the operation, not only the NC counter 30 values but also the values of the parameter table 31 and user counters 33 may be utilized. The user counter 33 values can be displayed on the display unit 15 of the CNC in the same manner that the values in the NC counters 30 are displayed, employing the known counter display 15.

The user counter 33 values are checked by the counter check processor 24 to determine whether there is interference or not. If it is determined that an interference condition exists, an alarm may be triggered and the servo controller 5 may be alerted, typically allowing the tool to stop its movement and the display unit 15 to display an alarm.

Figure 2A:
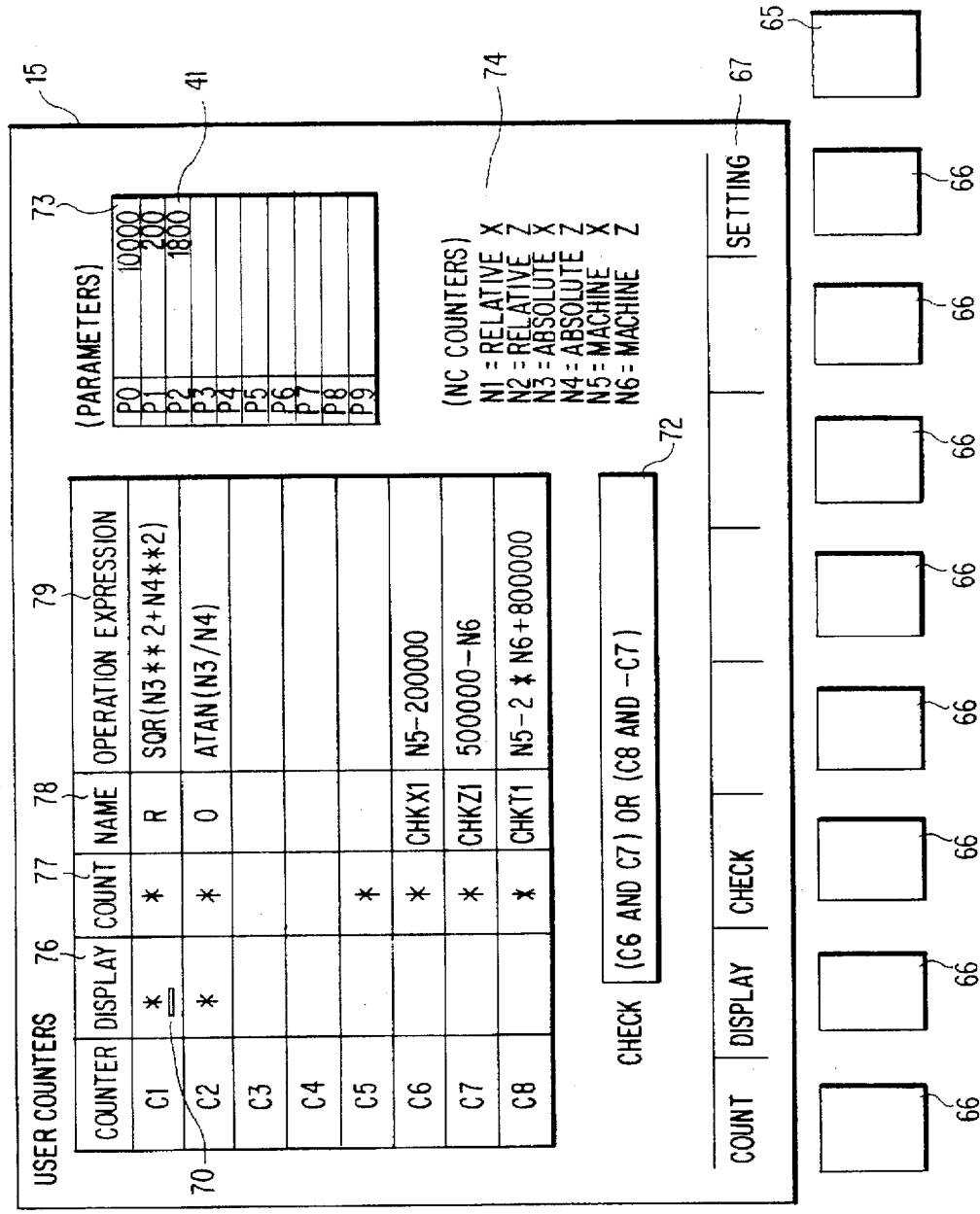
FIG. 2A provides an entry screen display example concerned with an embodiment of the present invention and FIG. 2B provides a table related to a function of the invention.

FIG. 2A shows a data setting screen for the CNC counter processing relating to the present invention. As shown in FIG. 2A, various data is displayed on the CRT screen 41 of the display unit 15.

Menu displays 67 are provided in the bottom section of the screen and any menu can be selected by pressing a corresponding menu key 66. The numeral 65 indicates a main menu key which, when pressed, causes a main menu (not illustrated) to be displayed in the menu display 67. The screen in FIG. 2A is displayed by pressing the menu key 66 corresponding to a "COUNT" menu (not shown) in the main menu.

Among the menus, the "COUNT" menu is employed to switch between an enable and a disable state of the count processing of the user counters, a "DISPLAY" menu to switch between an enable and a disable state of the display of the user counters, a "CHECK" menu to switch between an enable and a disable state of an interference check, and a "SETTING" menu to allow various data to be set.

Figure 3:
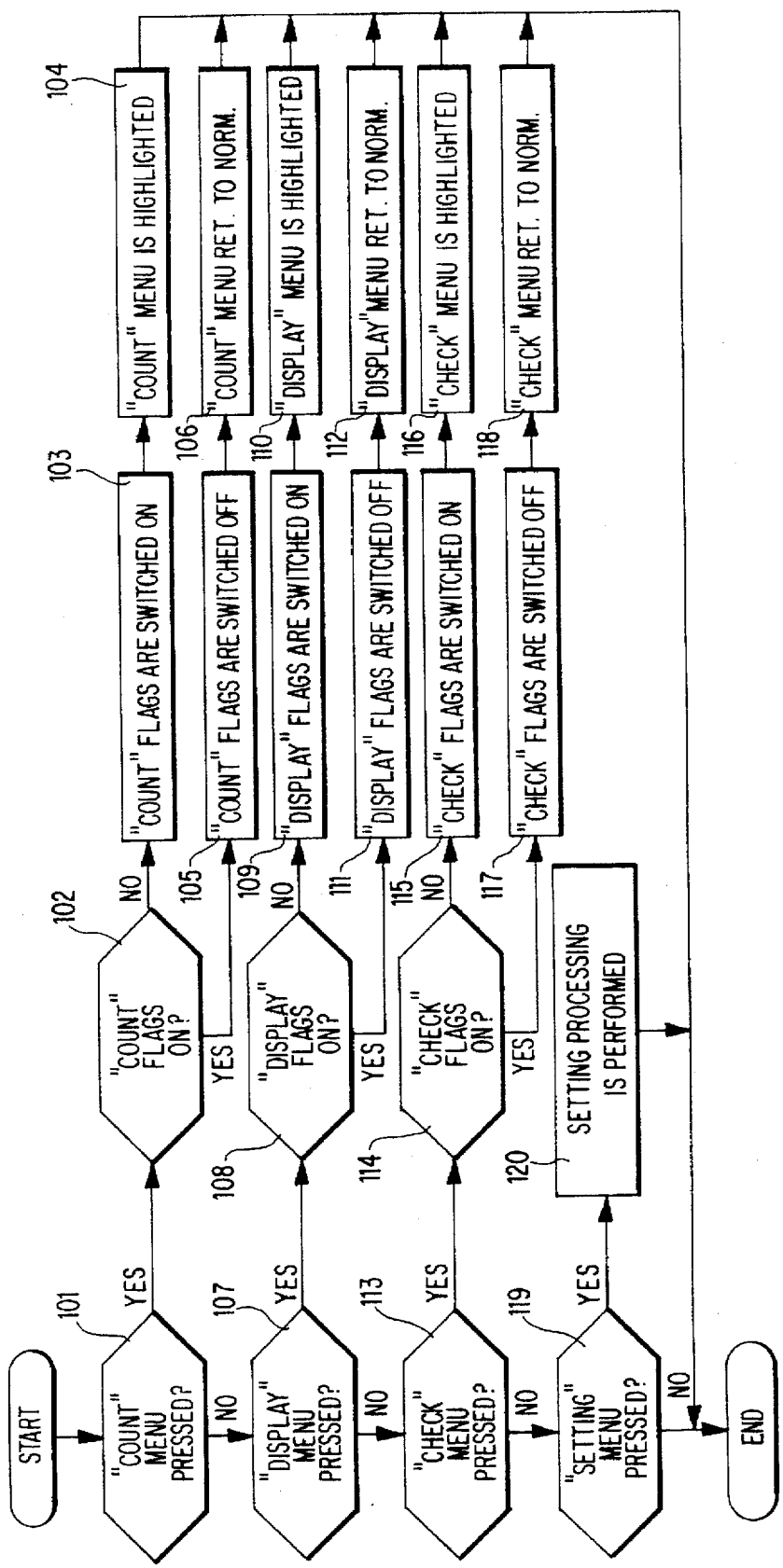
FIG. 3 is a flowchart for menu processing concerned with an embodiment of the present invention.

This menu processing will now be described in accordance with a flowchart shown in FIG. 3. When the "COUNT" menu key is pressed (step 101), count flags are checked (step 102). If off, the count flags are switched on, (step 103). This causes the "COUNT" menu to be highlighted (step 104), indicating that the count processing of the user counters is enabled, i.e., the count processing will be performed. If the count flags are on, they are switched off (step 105) to return the highlighted count menu to normal (step 106). This causes the count menu to assume the condition of an ordinary display, indicating that the count processing of the user counters is disabled, i.e., the count processing will not be performed. In similar manners, display flag and check flag ON/OFF and menu highlight/ordinary display are controlled for the "DISPLAY" menu and "CHECK" menu (steps 107 to 118). When the "SETTING" menu key is pressed (step 119), the setting processing for various data is performed (step 120).

This setting processing will now be described in relation to FIG. 2A. When the "SETTING" menu key is pressed, the "SETTING" menu is highlighted, indicating that data may be set. A cursor 70 is also displayed on the CRT screen 41. The numeral 71 indicates a section used to display and set various data concerning the user counters, with eight counters from "C1" to "C8" provided as the user counters.

A "DISPLAY" section 76 is employed to select the counter to be displayed as the user counter, with the selected counter marked "*" to indicate that it has been selected. The example in FIG. 2A shows that "C1" and "C2" have been selected as counters to be displayed. To switch on/off this selection, move the cursor 70 to the position of the counter to be selected and press a "1" key (not shown). The selection is then switched on and the "*" mark appears. Pressing a "0" key (not shown) switches off the selection and blanks the "DISPLAY" section. The cursor 70 is moved by pressing up, down, left and right direction keys (not illustrated).

A "COUNT" section 77 is employed to select the counter for performing count processing as the user counter, with the selected counter marked "*" to indicate that it has been selected. The example in FIG. 2A shows that five counters of "C1", "C2", "C6", "C7" and "C8" have been selected. The way of switching on/off the selection is similar to that for the "DISPLAY" section 76.

A "NAME" section 78 is used to define the name of the user counter, whose content is displayed on the CRT screen under that name. To display the content of a corresponding user counter, move the cursor 70 to the required counter position and enter any name from the keyboard. The example in FIG. 2A shows that the "C1" counter has been named "R", the "C2" counter "θ", the "C6" counter "CHKX1", the "C7" counter "CHKZ1", and the "C8" counter "CHKT1".

Figure 8:
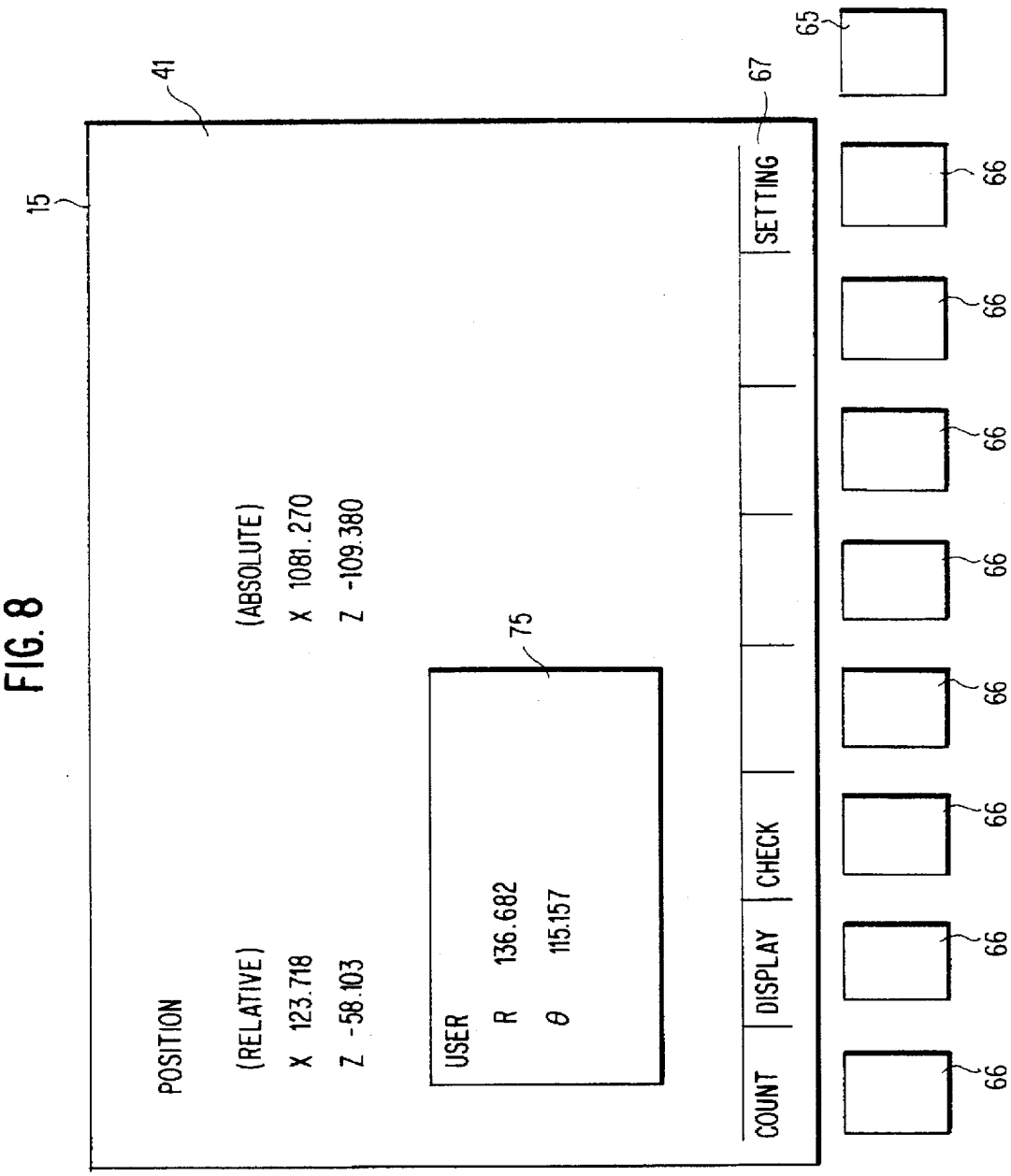
FIG. 8 provides a screen display example concerned with an embodiment of the present invention.
Figure 13:
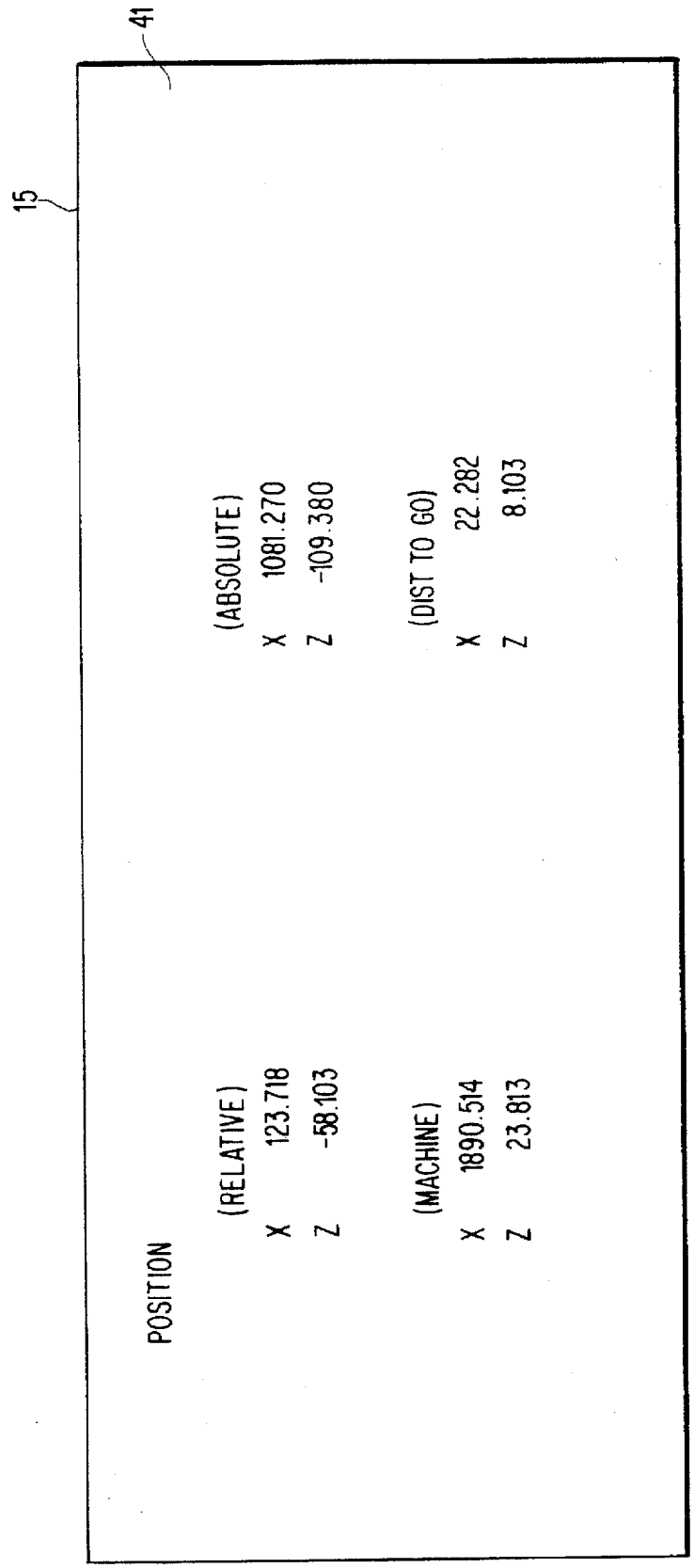
FIG. 13 gives a counter display example of the known numerical control unit.
Figure 14A:
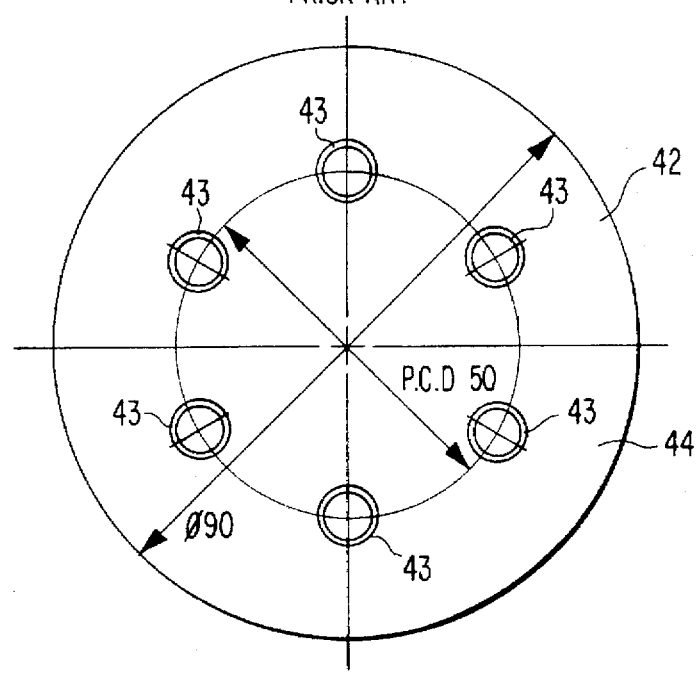
FIGS. 14A and 14B provide a first machining diagram example for illustrating the disadvantages in the conventional approach.
Figure 14B:
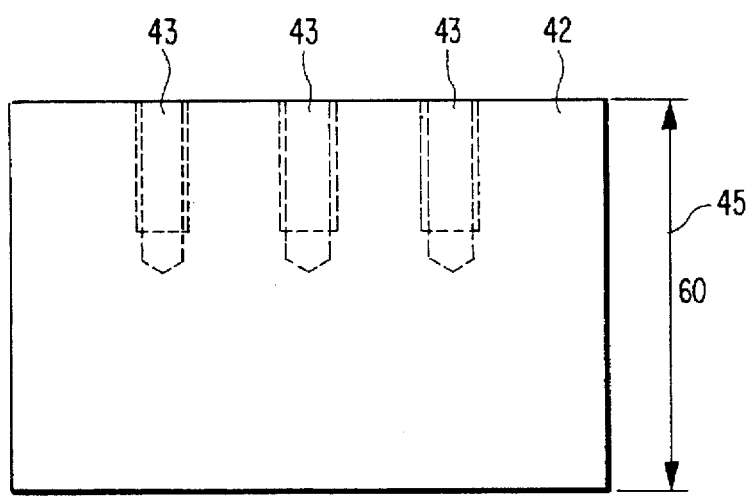

FIG. 8 gives a user counter display example. The conventional counter display section shown in FIG. 13 is additionally provided with a user counter display section 75, where the user counters defined in FIG. 2A are displayed.

FIG. 8 shows a display example of the data in FIG. 2A, wherein the counters "C1" and "C2" designated in the display section 76 in FIG. 2A are displayed under the name of "R" and "θ" defined in the name section 78.

Returning now to FIG. 2A, an "OPERATION EXPRESSION" section 79 is used to define what operation result is provided to each user counter. Available variables are the values of the NC counters indicated by 74, i.e., the values of the NC counters 30 shown in FIG. 1 can be referred to by the variable names "N1", "N2", "N3", "N4", "N5" and "N6".

In addition, the operator may optionally set parameters, which are the values of the parameter table 31 in FIG. 1. As indicated by 73 in FIG. 2A, the operator can set any signed values in ten parameters from "P0" to "P9", which may be referred to under the variable names "P0" to "P9".

The user counter values themselves may also be referred to by the variable names "C1" to "C8". In addition to the variables and constants (actual numerical values), the following may be used to represent operation expressions:

Arithmetic expressions
+: Addition
−: Subtraction
*: Multiplication
/: Division
**: Exponentiation
Functions
SIN: Sine
SQRT: Square value
COS: Cosine
ABS: Absolute value
TAN: Tangent
LN: Natural logarithm
ATAN: Arctangent
EXP: Exponent
ASIN: Arcsine
ACOS: Arccosine Parentheses may also be employed in the operation expression.

In the example shown in FIG. 2A, each user counter value is calculated as follows:

$C1 = N32.0 + N42.0$ $C2 = KAKUDO(N3, N4)$ $C6 = N5 - 20000$ $C7 = 500000 - N6$ $C8 = N5 - 2*N6 + 800000$

Here "KAKUDO" means a function to obtain an angle of N3/N4. If:

$DX = N4$ $DY = N3$, then

KAKUDO is a function to obtain an angle of $0 < \theta < 360°$ in accordance with DX, DY values as are shown in the table in FIG. 2B. There the angle C2 may be specified or determined by the values of $$\theta = \tan^{-1}\frac{DY}{DX}$$

for $(-90° < \theta < 90°)$, depending on the values of DX and DY.

A discriminant for use in an interference check is set by a check expression setting section 72 and is represented by the logical operation of the user counters "C1" to "C8":

.AND.: Logical product

.OR.: Logical add with the user counters employed as variables.

The user counters "C1" to "C8" are logically operated on as true (i.e., "1") if their values are positive and as false (i.e., "0") if they are zero or negative.

In the example shown in FIG. 2A, the logical operation of:

(C6 and C7) or (C8 and −C7)

is performed using the values of the user counters "C6", "C7" and "C8", wherein only if the user counter "C6" value is positive and the "C7" value is positive or the "C8" value is positive and the "C7" value is negative, the above operation expression is true and regarded as the absence of interference, and in any other cases, it is false and regarded as the presence of interference.

FIG. 4 gives an example of counter controlling commands described in a machining program. By describing commands headed by "$" in an ordinary NC machining program 80, various data shown in FIG. 2A can be set. In FIG. 4, $ Cn=(n=1 to 8)

defines the user counter, i.e., defines the name section 78 and operation expression section 79 in FIG. 2A.

$ C1=R, SQR(N32+N42)

$ C2=θ, ATAN(N3/N4)

$ C6=CHKX1, N5−200000

$ C7=CHKZ1, 500000−N6

$ C8=CHKT1, N5−2*N6+800000 define in the machining program the data of the name section 78 and operation expression section 79 shown in FIG. 2A.

$ C1=R, SQR(N32+N42)

indicates that it defines the name of the user parameter "C1" as "R" and the operation expression as SQR(N32+N42).

$ CK=(C6.AND.C7).OR.(C8.AND.−C7)

defines the check expression setting section 72 in FIG. 2A.

$ DISPLAY switches on/off the display section 76 in FIG. 2A.

$ DISPLAY C1,C2 SET indicates that the user counters "C1" and "C2" are switched on.

To switch off the display section 76 of the user counters, the command may be described as follows:

$ DISPLAY C1,C2 RESET $ COUNT switches on/off the counter section 77 in FIG. 2A.

$ COUNT C1,C2,C6,C7,C8 SET indicates that the user counters "C1", "C2", "C6", "C7" and "C8" are switched on.

To switch off the counter section 77 of the user counters, the command may be described as follows:

$ COUNT C1,C2,C6,C7,C8 RESET $ COUNT ON switches on the count flags and is the equivalent of the "COUNT" menu highlighted by pressing the menu key 66 corresponding to the "COUNT" menu displayed in the menu display section 67 in FIG. 2A.

To switch off the count flags, describe the command as follows:

$ COUNT OFF $ DISPLAY ON switches on the display flags and is the equivalent of the "DISPLAY" menu highlighted by pressing the menu key 66 corresponding to the "DISPLAY" menu displayed in the menu display section 67 in FIG. 2A.

To switch off the display flags, describe the command as follows:

$ DISPLAY OFF $ CHECK ON switches on the check flags and is the equivalent of the "CHECK" menu highlighted by pressing the menu key 66 corresponding to the "CHECK" menu displayed in the menu display section 67 in FIG. 2A.

To switch off the check flags, describe the command as follows:

$ CHECK OFF

Figure 5:
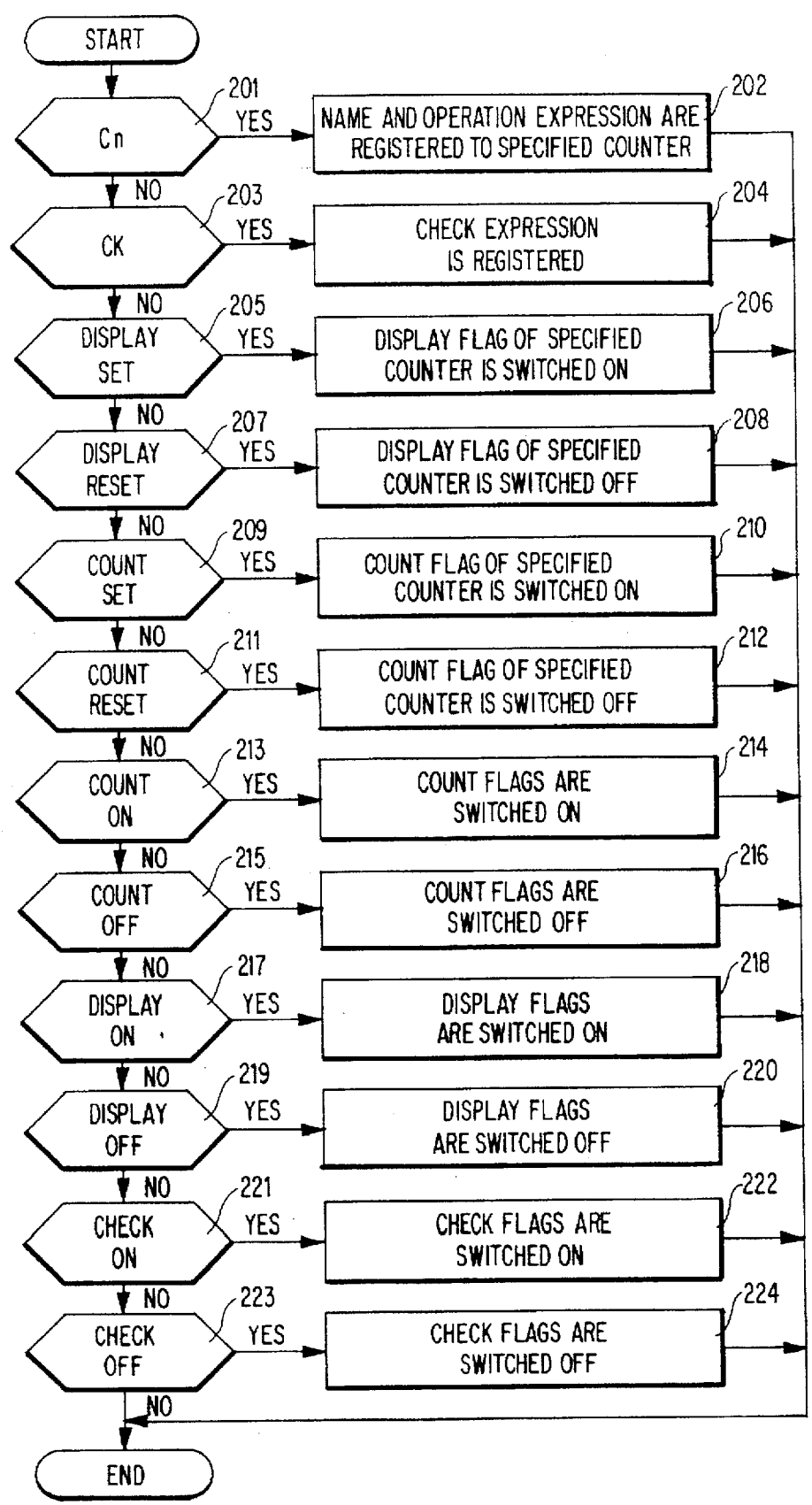
FIG. 5 is a flowchart for machining program processing concerned with an embodiment of the present invention.

As described above, the "$" mark heading any counter controlling command divides the command from the other ordinary machining program sections. Any portion headed by the "$" mark is processed as shown in FIG. 5.

First, if:

"Cn" (n=1 to 8)

has been designated (step 201), the name and operation expression defined for the specified user counter (any of C1 to C8) are registered (step 202). At this time, the other or no name and/or operation expression defined is considered as a command which cancels the data already registered. For example, if:

$ C1=, N3+20000 has been specified with the name of "R" and the operation expression of "SQR(N32+N42)" already registered to the "C1" user counter, the command indicates that the name "R" is canceled, the name section 78 is blanked, and the operation expression is changed to "N3+20000". If:

$ C1=radius, has been designated, the command indicates that the name "R" is changed to "radius" and the operation expression remains unchanged. If "*", is not provided as indicated below:

$ C1=radius this data results in a machining program error and is ignored, causing an error to be displayed on the CRT screen 41.

If:

$ C1=, or $ C1= has been specified, both the name and operation expression of the user counter "C1" are canceled, and both the name section 78 and operation expression section 79 are blanked.

Then, if "CK" has been designated (step 203), the check expression defined is registered (step 204). If "DISPLAY SET" has been specified (step 205), the display flag for each specified counter is switched on (step 206). If "DISPLAY RESET" has been specified (step 207), the 24 display flag for each specified counter is switched off (step 208). Similarly, "SET" and "RESET" of "COUNT" are checked (steps 209, 211) and each count flag is switched on/off (steps 210, 212). If "COUNT ON" has been designated (step 213), the count flags are switched on (step 214), and if "COUNT OFF" has been specified (step 215), the count flags are switched off (step 216).

In a similar manner, "ON" and "OFF" of "DISPLAY" and "CHECK" are judged (steps 217, 219, 221, 223) and the corresponding flags are switched on/off (steps 218, 220, 222, 224).

As described above, various data on counter control may either be set manually on the screen shown in FIG. 2A or on the machining program shown in FIG. 4.

Figure 6:
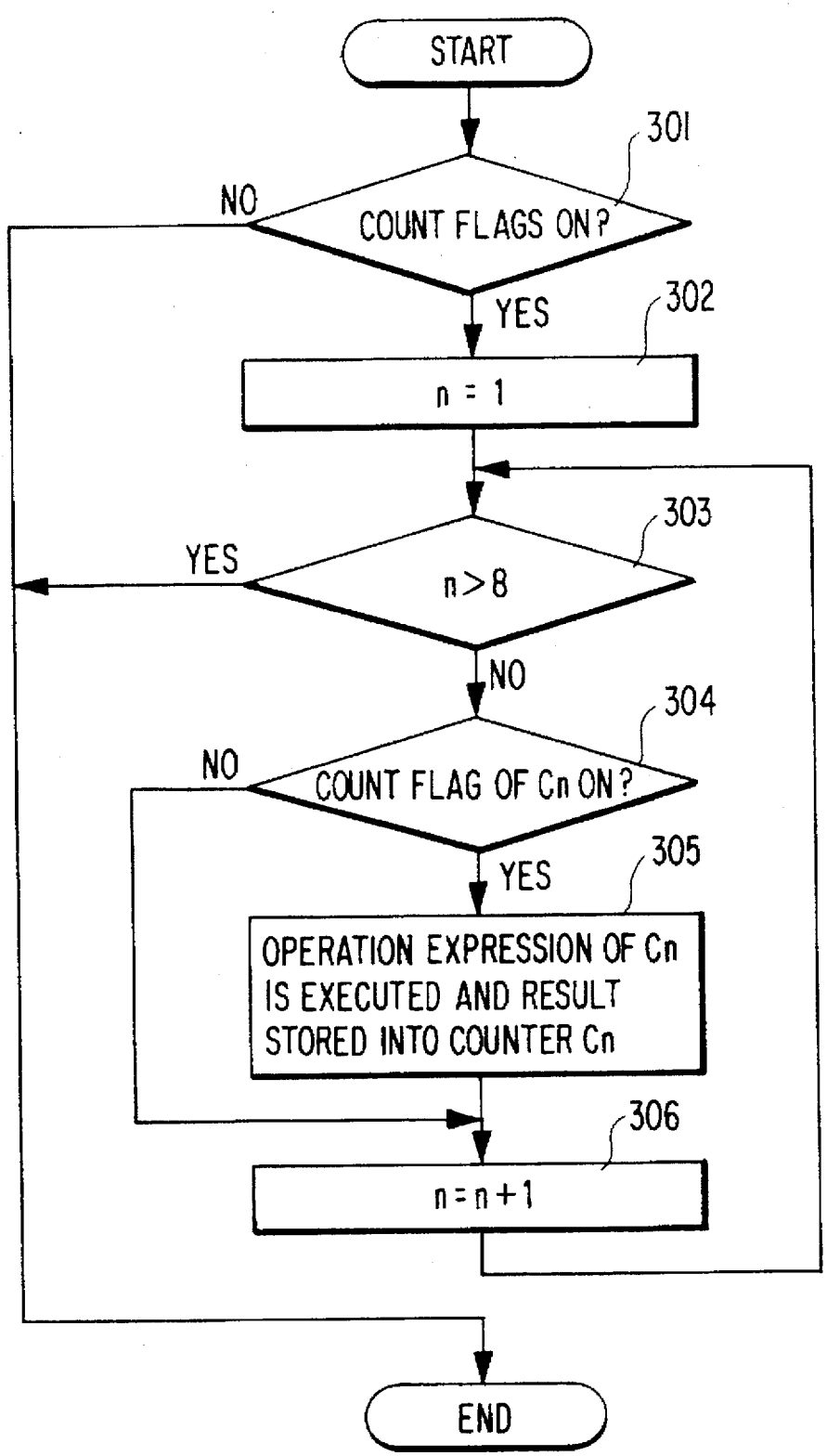
FIG. 6 is a flowchart for count processing concerned with an embodiment of the present invention.

Referring now to FIG. 6, the count processing of each user counter will be described in accordance with the flowchart. It is determined whether the count flags are on or off (step 301). If they are off, no count processing is performed. The count flags are on if the "COUNT" menu in the menu display 67 section in FIG. 2A is being highlighted. If the count flags are on, processing is performed for each user counter (steps 302, 303). It is judged whether the count flag for the user counter "Cn (n=1 to 8)" is on or off (step 304). If it is off, the processing transits to that for the next user counter. If it is on, operation processing is performed according to the operation expression defined for "Cn" and the operation result is stored into the counter "Cn" (step 305). The counter "Cn" value is stored into the user counter 33 section in FIG. 1.

Figure 7:
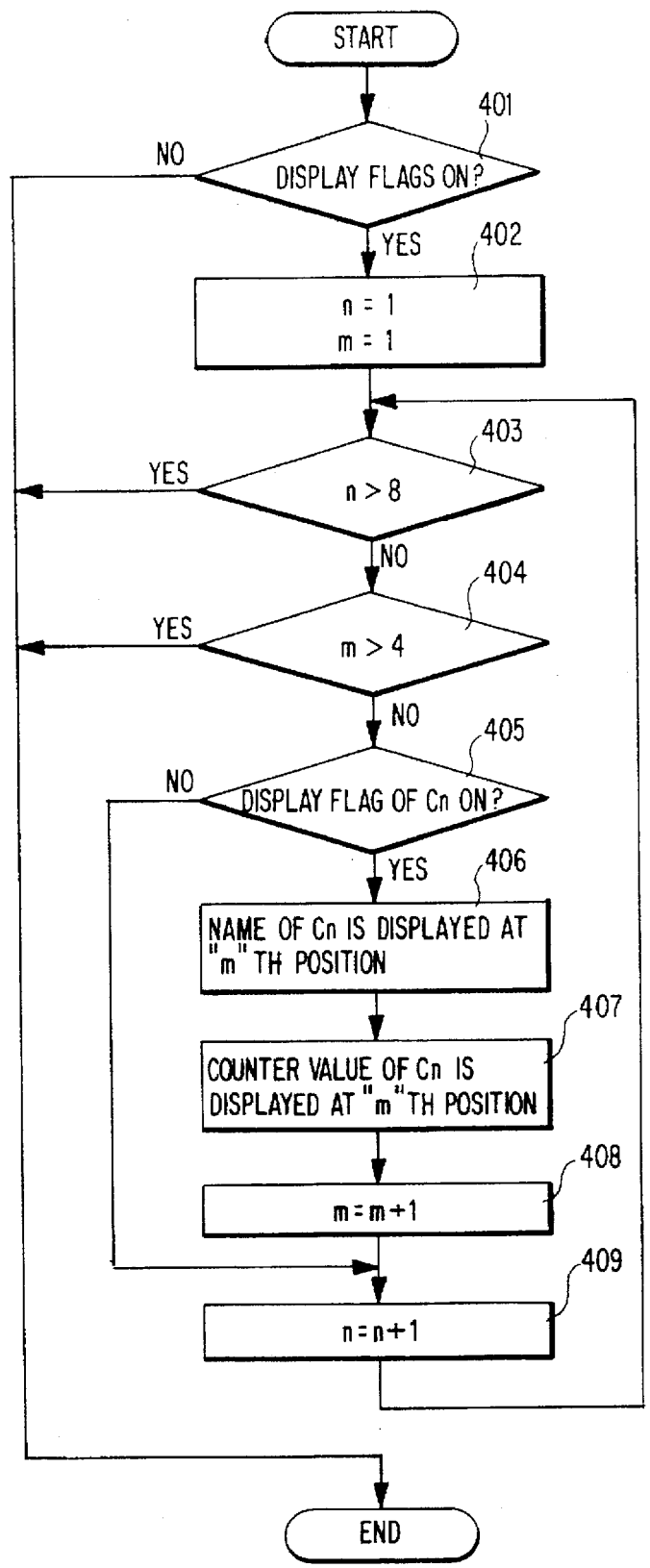
FIG. 7 is a flowchart for display processing relating to an embodiment of the present invention.

FIG. 7 is a flowchart illustrating a sequence of user counter display processing. It is determined whether the display flags are on or off (step 401). If they are off, no display processing is performed. The display flags are on if the "DISPLAY" menu in the menu display 67 section in FIG. 2A is being highlighted. If the display flags are on, display processing is performed for each user counter. First initialize processing is performed to set n to 1 and m to 1 (steps 402).

n is used to check the number of user counters. Since the present embodiment includes eight user counters, it is checked to see if processing has been performed for the eight counters (step 403). m is employed to check the number of user counters displayed. Since the present embodiment is designed to display up to four user counters at the same time, it is checked to see where the user counters are displayed or if more than four counters are displayed (step 404). It is checked if the display flag for the user counter "Cn (n=1 to 8)" is on (step 405). This display flag is on if "*" is being displayed in the display section 76 in FIG. 2A. If the display flag is off, the processing goes to step 409, progressing to the next counter processing. If the display flag is on, the name of the user counter "Cn (n=1 to 8)" is displayed in the "m"th position of the user counter display section 77 on the CRT screen 41 of the display unit 15 (step 406). This name is that of the user counter defined in the name section 78 in FIG. 2A. The actual counter value is then displayed (step 407). The counter display position is updated (step 408). The counter to be processed is updated (step 409).

FIG. 8 provides a user counter display example, wherein up to four specified user counters are displayed in the user counter display section 75.

Figure 9:
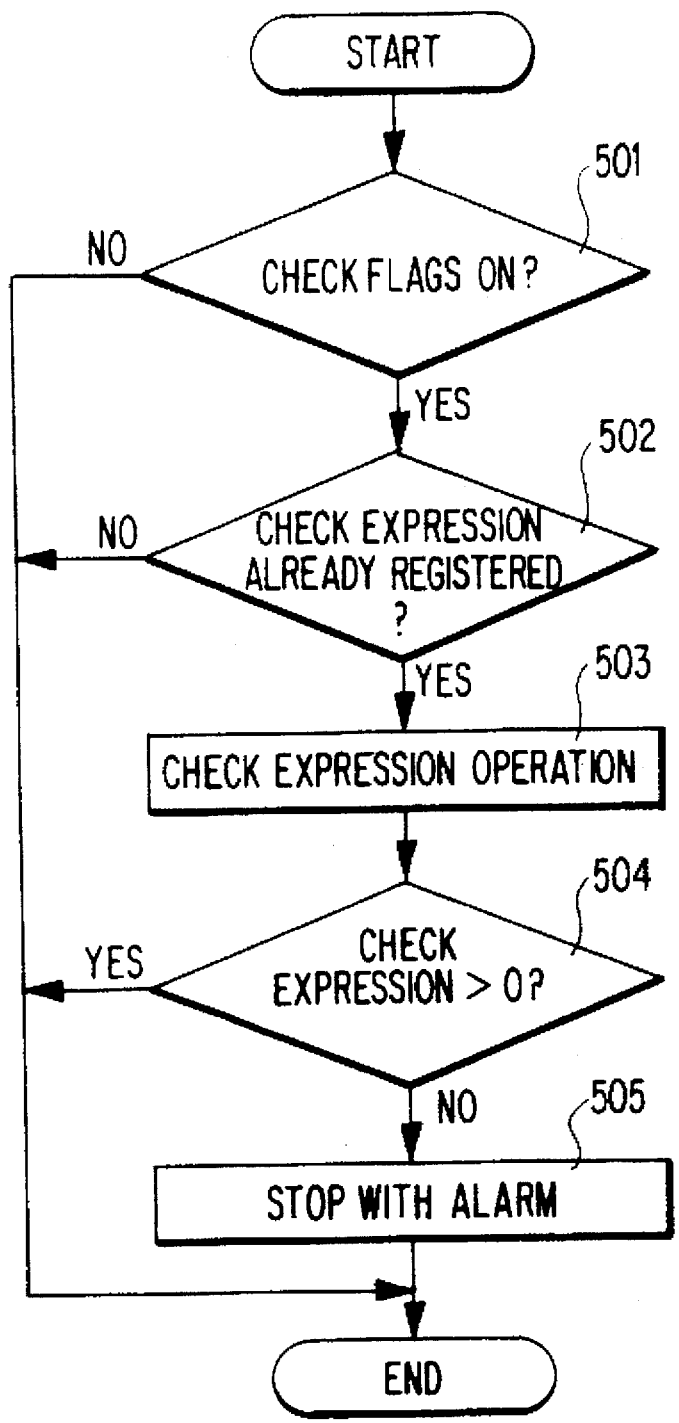
FIG. 9 is a flowchart for check processing relating to an embodiment of the present invention.

FIG. 9 is a flowchart illustrating a sequence of interference check processing for the user counters.

It is determined whether the check flags are on or off (step 501). If they are off, no interference check 27 processing is performed. The check flags are on if the "CHECK" menu in the menu display 67 section in FIG. 2A is being highlighted. If the check flags are on, interference check processing is performed. First it is determined whether a check expression has been registered (step 502). This determination is made to see if the check expression has been defined in the check expression setting section 72 in FIG. 2A. If the check expression has not yet been defined, the interference check processing is not performed. If it has already been registered, the check expression is operated on (step 503). If the check expression itself is in error at this time, the operation result is set to "1". If the operation result for the check expression is true (i.e., "1"), it is regarded that no interference has occurred. If the operation result is false (i.e., "0"), it is considered that interference has taken place (step 504). If interference is judged to have occurred, tool feed is brought to a stop, and at the same time, alarm is displayed on the CRT screen 41 (step 505).

Figure 10:
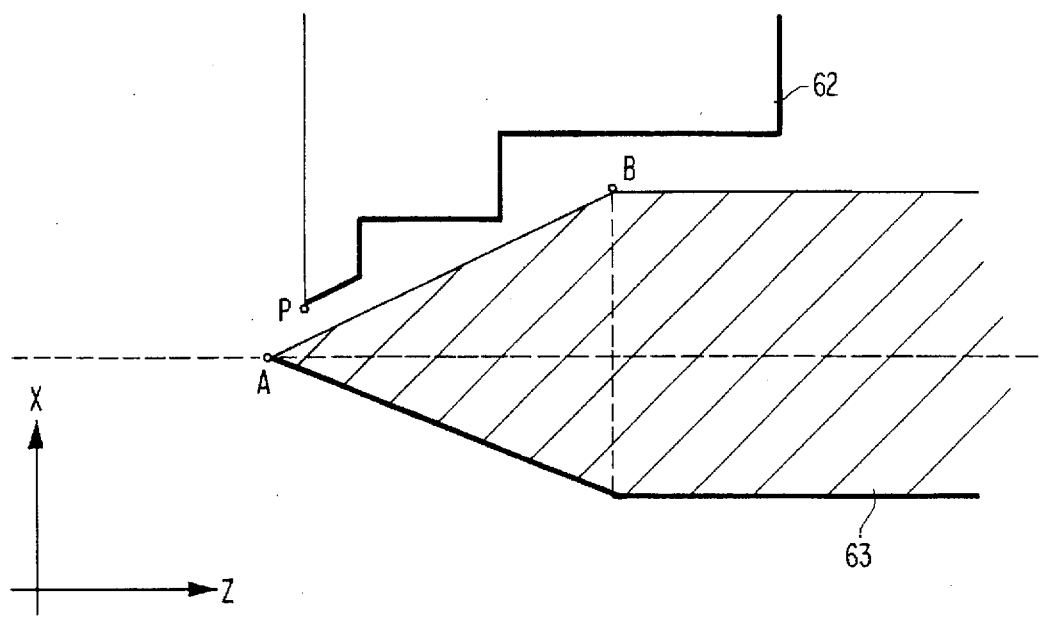
FIG. 10 illustrates the check processing relating to an embodiment of the present invention.
Figure 11:
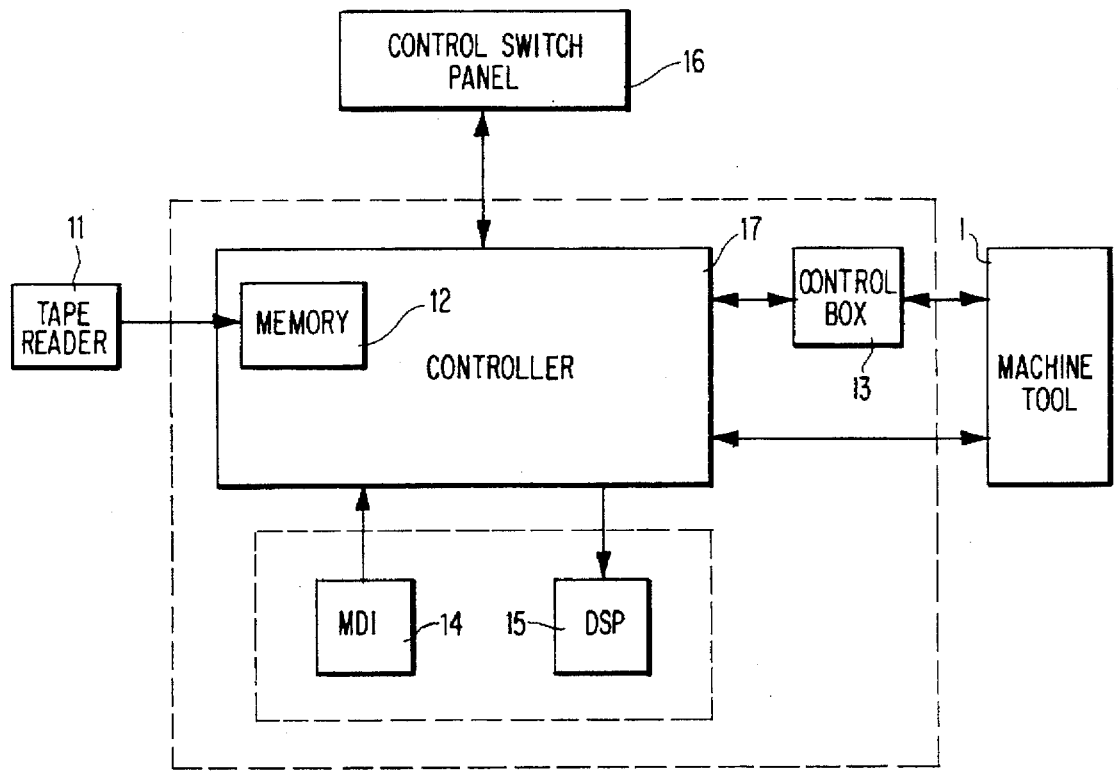
FIG. 11 is a block diagram showing the major components of a numerical control unit.

FIG. 10 gives an interference check example according to the present invention, showing that a check is made for interference between a tool area 62 and a tailstock area 63. It is supposed that a tool nose point P is indicated by the NC counters "N5" (MACHINE X) and "N6" (MACHINE Z). It is assumed that interference between the tool and tailstock occurs if the tool nose point P enters the tailstock area 63. The coordinate values (Z, X) of point A are supposed to be (0, 0) and those of point B to be (500000, 200000).

N5−200000 for "C6" is used to determine whether point P exists above or below point B.

500000−N6 for "C7" is employed to judge whether point P is located on the right- or left-hand side of point B.

N5−2*N6+800000 for "C8" is used to determine whether point P is above or below a straight line passing points A and B. In the check expression (C6.AND.C7).OR.(C8.AND.−C7):

C6.AND.C7 is regarded as true, i.e., as the presence of interference, if the values of both C6 and C7 are negative, indicating that point P is below and on the right-hand side of point B, i.e., has entered the tailstock area 63.

Figure 20:
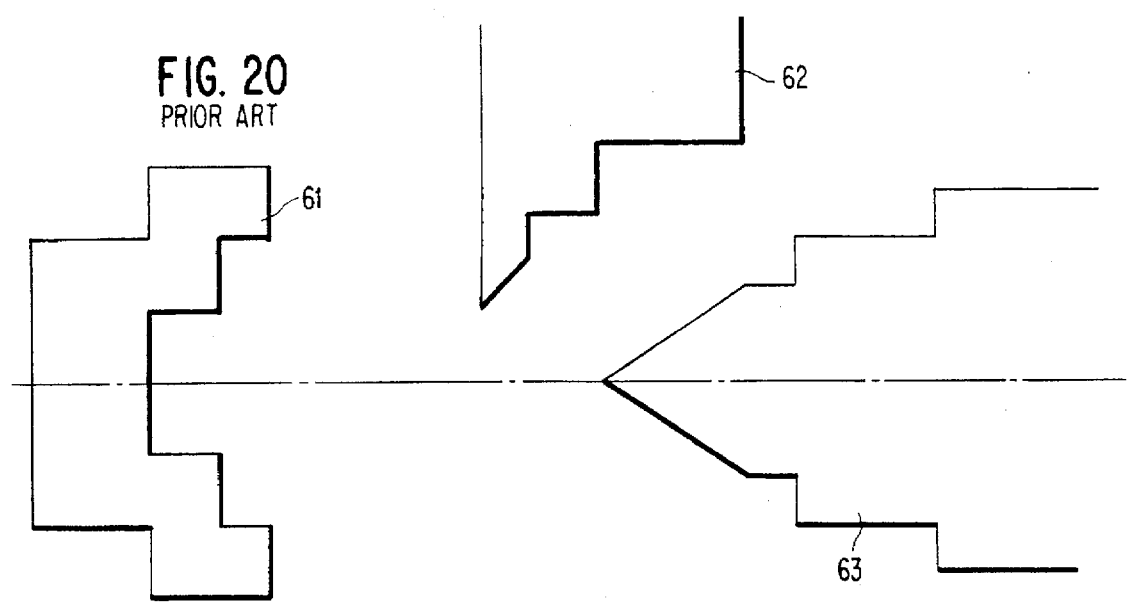
FIG. 20 illustrates the manner in which tool and structure interference can exist in the conventional design.
Figure 22:
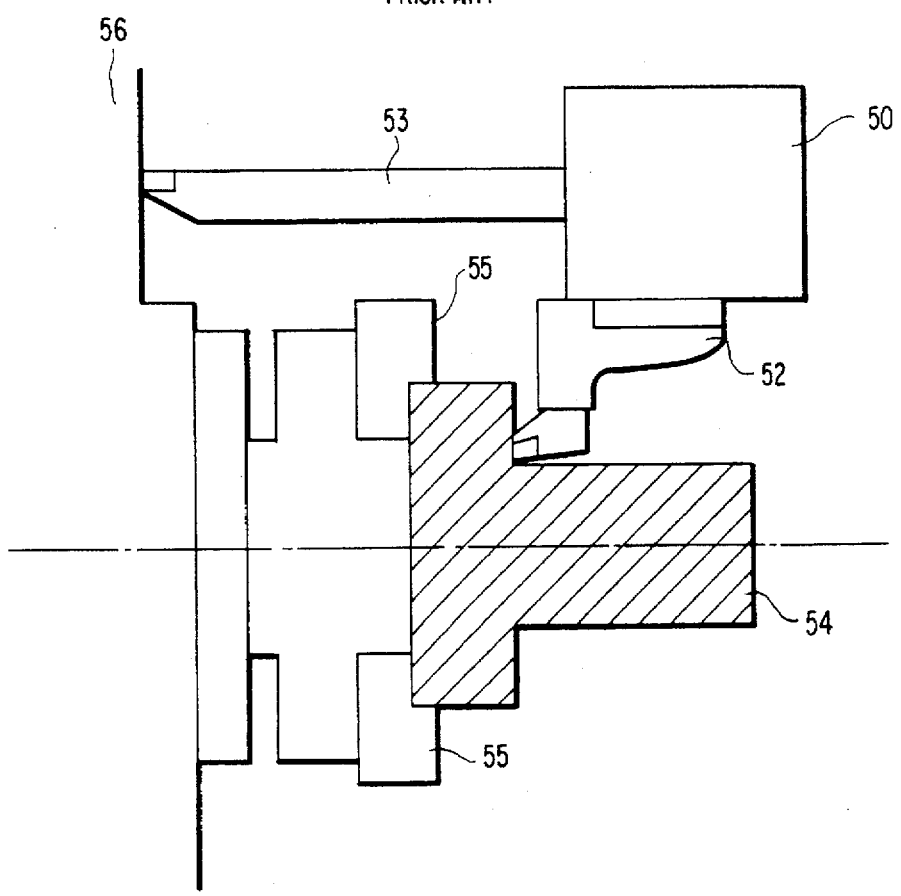
FIG. 22 gives a tool interference example for illustrating the disadvantages in the conventional approach.
Figure 21:
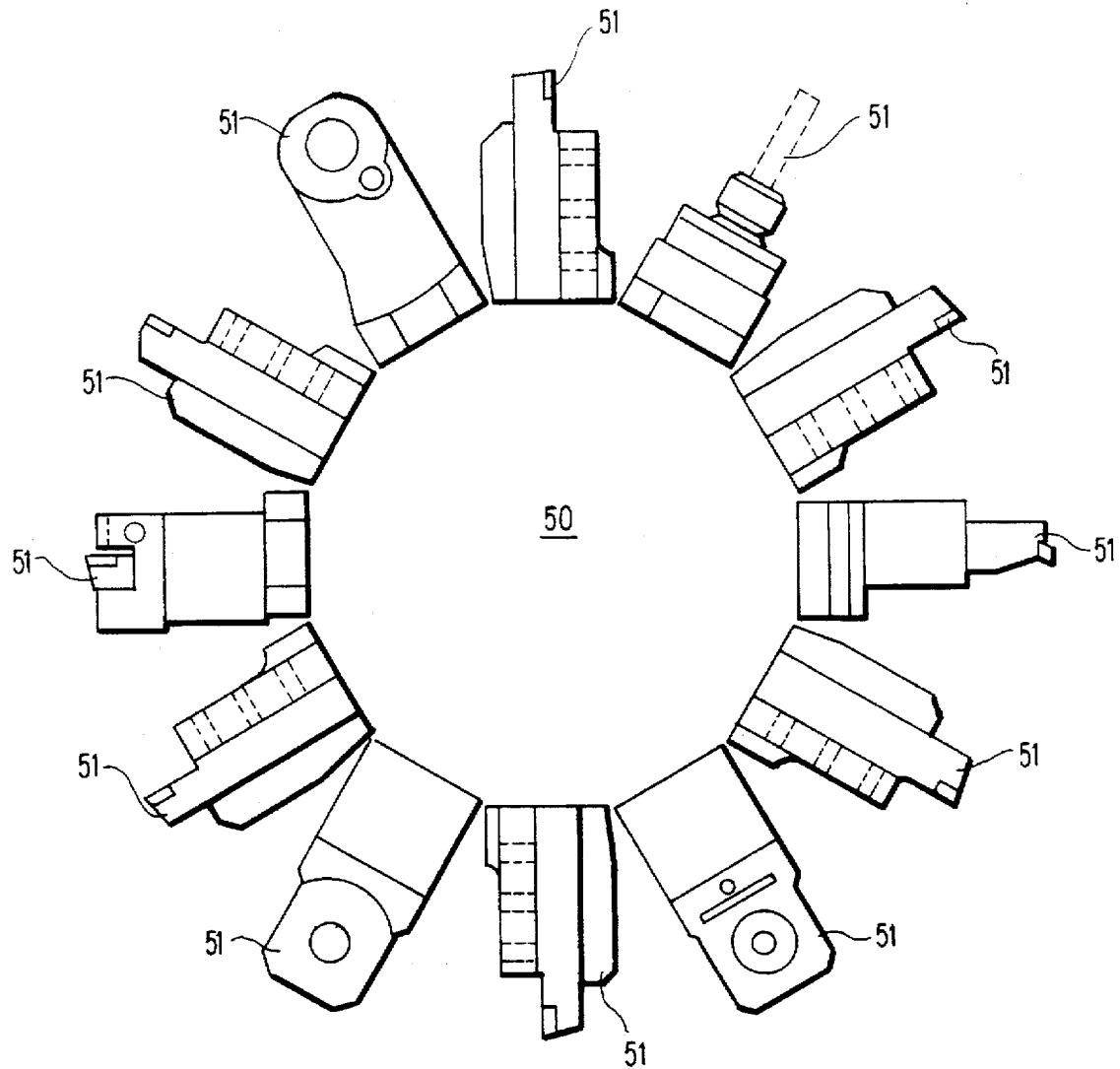
FIG. 21 shows tools in the installed states for illustrating the disadvantages in the conventional design.

C8.AND.−C7 is considered true, i.e., the presence of interference, if C8 is negative and C7 is positive, indicating that point P is below the straight line passing points A and B and on the left-hand side of point B, i.e., has advanced into the tailstock area 63. In the above case, the interference check is performed with the tailstock area 63 split in two. In this case, the configuration of tailstock area 63 is different from tailstock area 63 shown in FIG. 20. In an example shown in FIG. 20, configurations of tool area 62 and tailstock area 63 are simplified and defined, but when tailstock area shown in FIG. 10 is defined, border line on which any part of a tool interferes with a tailstock is defined by considering locus of tool nose point P.

In this embodiment, it is needless to say that the number of user counters (eight), that of simultaneously displayable user counters (four) and that of parameters (ten) may optionally be changed as necessary.

In addition, the "$" mark heading any block of the counter controlling command in the machining program may be replaced by another symbol and the command format itself may also be changed. Also in the above embodiment, as an operation expression to check interference, an operation express and a checking express to obtain a desired value from the value of NC counter 30 are separately set, but both may be united as one operation expression.

Furthermore, in the above embodiment, an example is explained in which a counter processor 23 and a counter check processor 24 are used as a means to check interference but these counter processor 23 and counter check processor 24 may be united.

It will be apparent that the present invention, as described above, achieves a counter display system which offers the operator the easiest form of grasping the machining status, thereby allowing the operator to easily check whether proper machining is carried-out in accordance with commands.

The counter displays are provided not in accordance with mathematical expressions that are fixed in the numerical control unit, like the conventional counter displays, but in accordance with the operation expressions selected or optionally created by the operator, thereby greatly increasing the available variety of counter displays.

The present invention also performs original interference checks, thereby allowing machining to be carried out safely, e.g., during test machining.

The counters can be controlled in the machining program, whereby the operator is offered the most convenient counter displays and can easily check whether machining is being done properly or not.

Interference checks can be controlled in the machining program so as to be performed in accordance with machining conditions. This has enabled smaller resolution for the interference checks and has eliminated the inefficiency resulting from running interference checks equally whereby portions that would never interfere are still tested.

Once an interference check is made and passed, no subsequent interference check need be performed, e.g., when a multiplicity of identical workpieces are to be machined. In such case, subsequent interference checks would be meaningless (interference cannot occur) if interference does not take place in the interference check on the first workpiece. Accordingly, it is possible to carry out a control through the machining program so that the interference check from the second time on is not performed.

Further, when only one workpiece is used for a test machining and interference check, and if this check results in interference, no further interference check is desired or needed during actual machining. Instead, a block instructing the interference check can be written as a block delete block, e.g.:

/$ CHECK ON

Then, when actual machining is carried out with the block delete ON, machining can be performed without making further interference checks.

A further embodiment which can automatically determine operation expressions to locate an arbitrary tool nose position and to check interference in an arbitrary position may be implemented with an NC unit which has an automatic programming function.

Thus far, two cases have been described. In one, various data concerning counter processing is set directly from the display screen of the NC unit. In the other, it is defined in the machining program. But as another application example, it is possible to use the invention in an NC unit with an automatic programming function. Since an NC unit with an automatic programming function normally machines in accordance with preset machining patterns, it is possible to judge automatically what kind of counter display on the NC side can provide operators with appropriate machining information for that pattern.

Because of this, in case a counter display or an interference check of this invention is utilized in NC unit with an automatic programming function, it is possible to set data in counter information table 32 in FIG. 1 during an analysis of machining data, input from the input section, so long as it has an interpreter-type automatic programming function, i.e., type to machine which analyzing defined machining data. However, in case the NC unit has a compiler-type automatic programming function, i.e., where defined machining data is analyzed and then converted to an ordinary machining program (EIA/ISO type machining program) before machining, it is necessary to write instructions to control the counters shown in FIG. 4 in the converted machining program.

For example, in a machining shown in FIG. 15A, if X, Y coordinate values and θ degrees define the configuration and its distance away from the X, Y axes, and these values are given to the automatic programming function, the automatic programming function will set certain data in counter information table 32 in FIG. 1, as explained by example below.

When the interpreter type automatic program function is run:

(1) Turn "ON" the "Display" of Counter "C3" and "C4".
(2) Turn on the counts of counter "C1", "C2", "C3", and "C4".
(3) Counter "C3" is named "X".
(4) Counter "C4" is named "Y".
(5) Center Coordinate value "X" is set in Parameter "P0".
(6) Center Coordinate value "Y" is set in Parameter "P1".
(7) Inclination of 0 degrees is set in Parameter "P2".
(8) Operation Expression of Counter "C1" is defined as follows:

SQR ((N3−P0)2+(N4−P1)2)

(9) Operation Expression of Counter "C2" is defined as follows:

KAKUDO(N3−P0), (N4−P1)−P2

(10) Operation Expression of Counter "C3" is defined as follows:

P0+C1*COS(C2)

(11) Operation Expression of Counter "C4" is defined as follows:

P0+C1*SIN(C2)

Here N3 shows X coordinate value and N4 shows Y coordinate value of NC counter absolute coordinate.

Figure 15A:
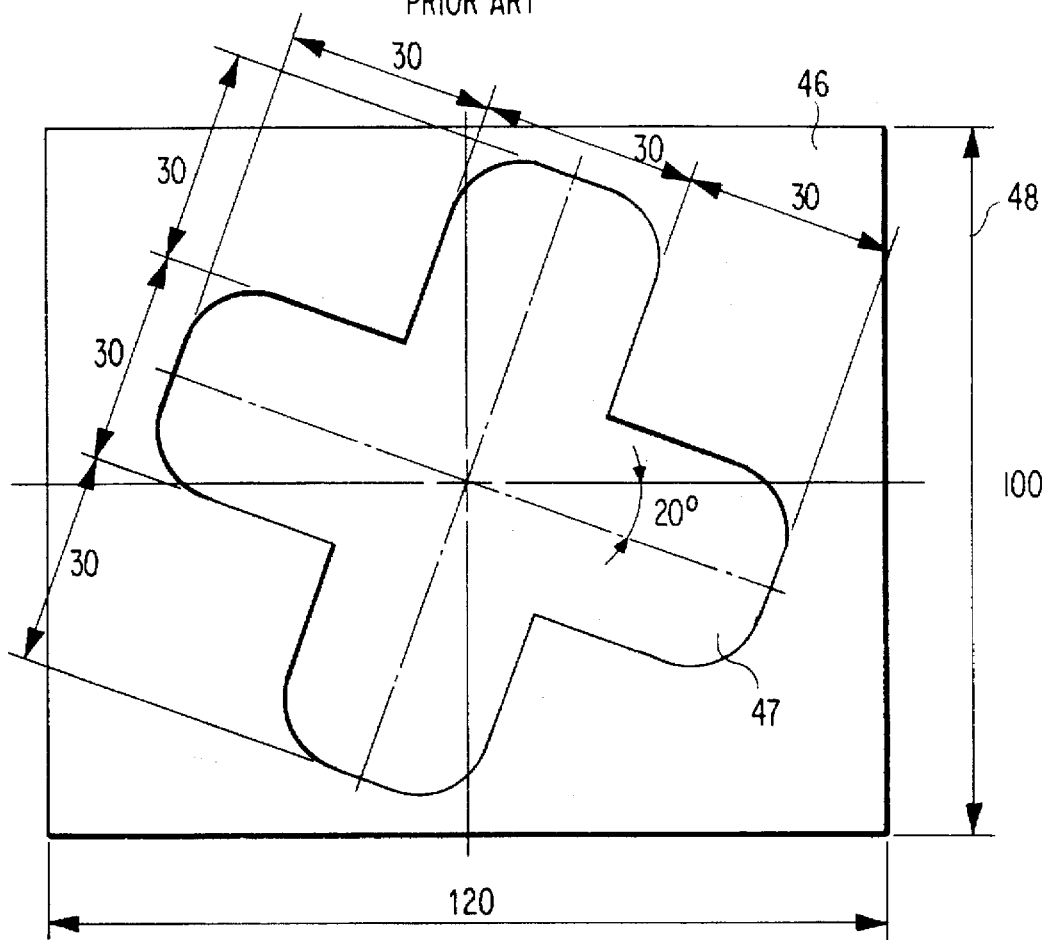
FIGS. 15A and 15B provide a second machining diagram example for illustrating the disadvantages in the conventional design.
Figure 15B:
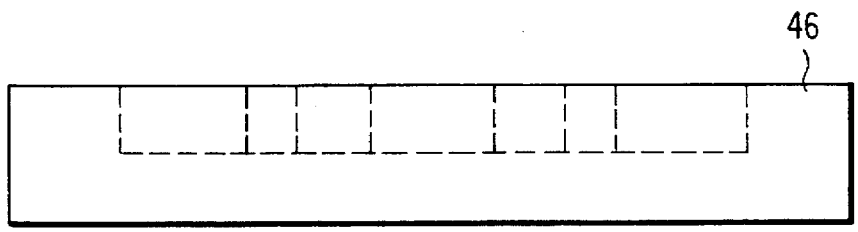
Figure 16:
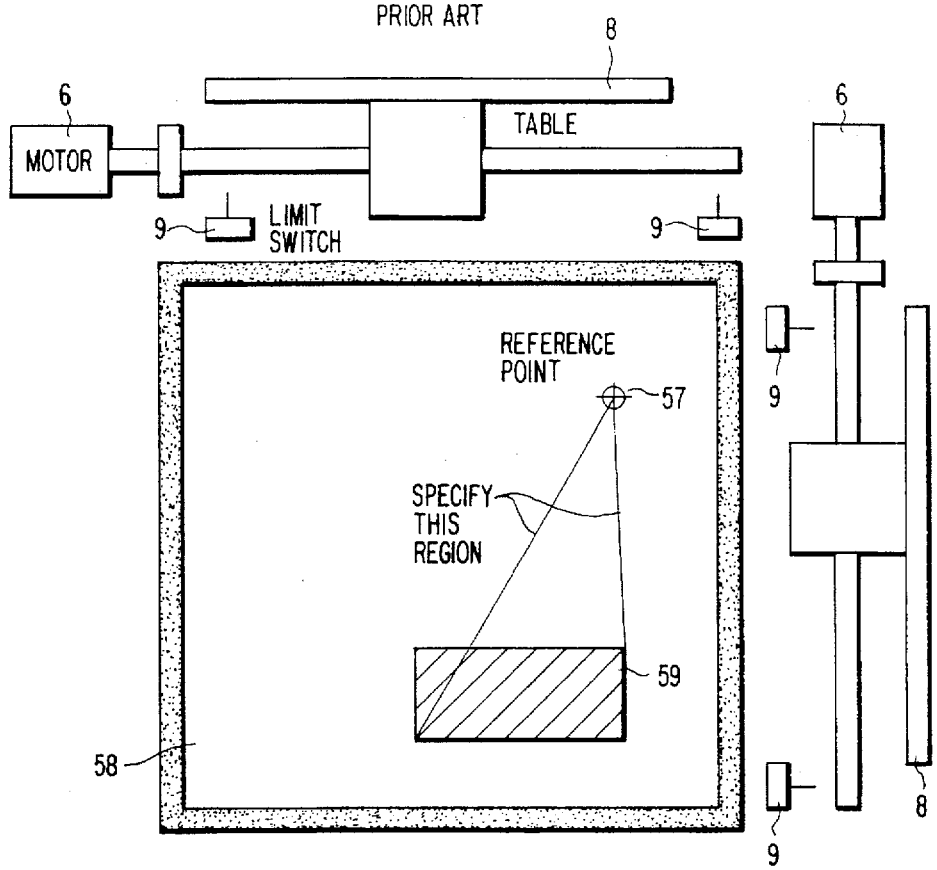
FIG. 16 illustrates a view of the machining apparatus together with restrictions on the moveable area for the tool in the conventional design.
Figure 17:
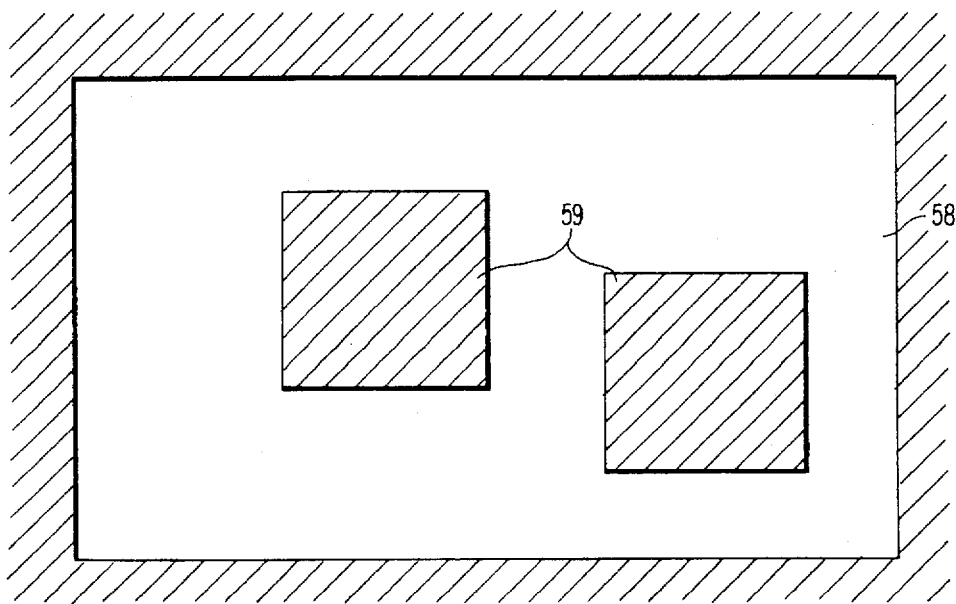
FIG. 17 illustrates non-entry areas that serve as a second check mechanism in the conventional design.
Figure 18:
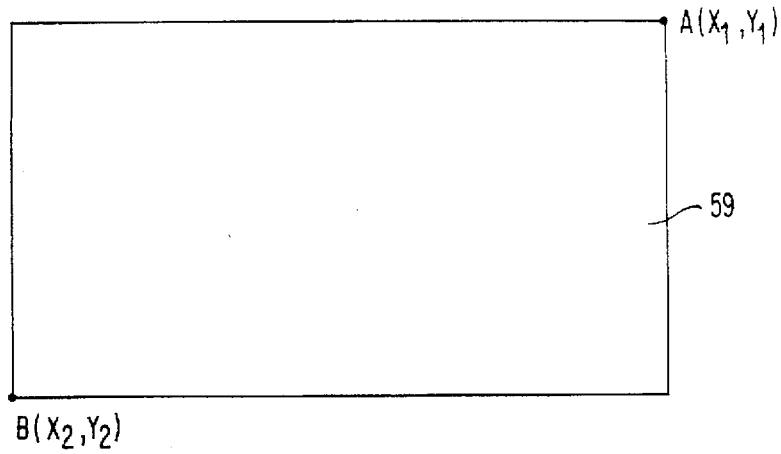
FIG. 18 illustrates the manner in which the non-entry areas may be defined in the conventional design.
Figure 19A:
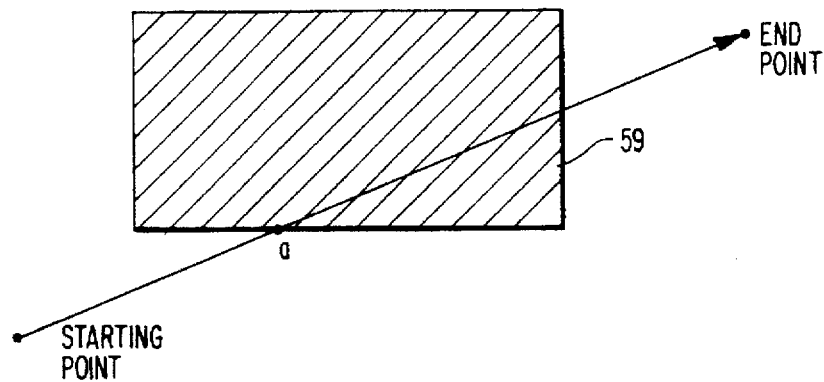
FIG. 19A and 19B illustrate the manner in which the non-entry areas affect the locus of tool movement in the conventional design.
Figure 19B:
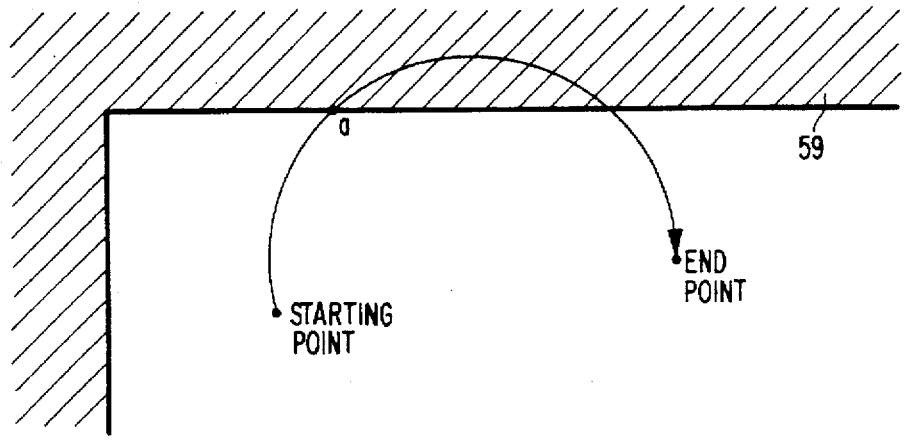

In this manner, by setting necessary information for parameter table 31 or counter information table 32 shown in FIG. 1, when machining shown in FIG. 15A is performed with an automatic programming function, a counter display with compensated inclination, (i.e., counter display after as much as inclination from X, Y axes formed from X, Y coordinate values designated by the automatic function as center points is rotated in a reversed direction), can be shown in user counter display section 75 in FIG. 8.

The entire disclosure of each and every foreign patent application from which the benefit of foreign priority has been claimed in the present application is incorporated herein by reference, as if fully set forth.

Although this invention has been described in at least one preferred form with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. In a counter display control system for a numerical control unit, the improvement comprising:

means for inputting a user-specified mathematical expression to the counter display control system; and means for operating on detected movement values to produce operation results, said operation results being produced by using at least one of the detected movement values as a parameter in said user-specified mathematical expression;

wherein said operation results are displayed via the counter display control system; and wherein the user is free to input any useful expression as said specified mathematical expression.

2. In an interference check control system for a numerical control unit, the improvement comprising:

means for inputting a user-specified mathematical expression to the interference check control system;

means for operating on detected movement values to produce operation results, said operation results being produced by using at least one of the detected movement values as a parameter in said user-specified mathematical expression; and means for judging the presence or absence of interference based on said operation results;

wherein the user is free to input any useful expression as said specified mathematical expression.

3. In a counter display control system for a numerical control unit, the improvement comprising:

means for inputting to the counter display control system a mathematical expression embedded in a machining program running on the numerical control unit; and means for operating on detected movement values to produce operation results, said operation results being produced by using at least one of the detected movement values as a parameter in said mathematical expression embedded in said machining program;

means for displaying said operation results via the counter display control system; and wherein a programmer of the numerical control unit is free to program any useful expression as said mathematical expression.

4. In an interference check control system for a numerical control unit, the improvement comprising:

means for inputting to said counter display control system a mathematical expression embedded in a machining program running on said numerical control unit;

means for operating on detected movement values to produce operation results, said operation results being produced by using at least one of said detected movement values as a parameter in said mathematical expression embedded in said machining program; and means for judging the presence or absence of interference based on said operation results;

wherein a programmer of the numerical control unit is free to program any useful expression as said mathematical expression.

5. A method of identifying the position of a moveable portion of a machine tool comprising:

generating signals representing the movement of said moveable portion within a first reference system;

storing said signals as first values for said first reference system as stored counter values;

manually generating a plurality of mathematical expressions via an input keyboard;

storing said plurality of mathematical expressions as stored mathematical expressions;

operating on at least selected said stored counter values to produce, as operation results, second values corresponding to a second reference system, wherein said operation results are produced by using selected ones of said stored counter values as parameters in a selected one of said stored mathematical expressions wherein a user is free to manually generate, via said input keyboard, any useful expressions as the plurality of mathematical expressions.

6. The method of claim 5 further comprising: storing parameter values;

wherein said operating step is further performed on the basis of said parameter values.

7. The method of claim 5, wherein said operating step is performed on the basis of previously stored operation results.

8. The method of claim 5, further comprising storing said operation results separate from said first values.

9. The method of claim 8, further comprising displaying at least said operation results for operator reference.

10. The method of claim 5, further comprising generating said operation expressions.

11. The method of claim 10, wherein said generating step comprises generating said operation expressions automatically by programmed control.

12. The method of claim 10, wherein said generating step comprises generating said operating expressions manually.

13. The method of claim 5, wherein said operation expressions comprise at least one of arithmetic and function expressions.

14. An apparatus for identifying the position of a moveable portion of a machine tool comprising:

means for generating signals representing the movement of said moveable portion in a first reference system;

means for storing said first values indicating the present position of said moveable portion in said first reference system;

manual input means for inputting mathematical expressions;

counter operation storage means for storing said mathematical expressions; and means for operating on at least selected ones of said stored first values to produce, as operation results, second values corresponding to a second reference system, wherein said operation results are produced by using said stored first values as parameters in a selected one of stored mathematical expressions wherein a user is free to manually generate, via said manual input means, any useful expressions as said mathematical expressions.

15. The apparatus set forth in claim 14 further comprising:

parameter table means for storing parameter values, wherein said operating means further operates on the basis of said parameter values.

16. The apparatus set forth in claim 14 further comprising:

user storage means for storing said operation results.

17. The apparatus set forth in claim 16, further comprising display means for displaying said stored operation results.

18. The apparatus set forth in claim 14, wherein said operating means further operates on the basis of previously calculated and stored operation results.

19. The apparatus set forth in claim 14, further comprising means for generating said operation expressions.

20. The apparatus set forth in claim 19, wherein said means for generating comprises automatic programming means.

21. The apparatus set forth in claim 19, wherein said means for generating comprises manual input means.

22. An apparatus for identifying the position of a moveable portion of a machine tool comprising:

means for generating signals representing the movement of said moveable portion in a first reference system;

means for storing said first values indicating the present position of said moveable portion in said first reference system;

manual input means for inputting mathematical expressions;

counter operation storage means for storing said mathematical expressions;

means for operating on at least selected ones of said stored first values to produce, as operation results, second values corresponding to a second reference system, wherein said operation results are produced by using said stored first values as parameters in a selected one of stored mathematical expressions; and processor means for processing the first values stored in said means for storing in order to determine whether there is an interference;

wherein a user is free to manually generate, via said manual input means, any useful expressions as said mathematical expressions.

23. The apparatus set forth in claim 22 further comprising:

means for issuing an alarm if it is determined that there is interference.

24. The apparatus set forth in claim 23, further comprising means for displaying an alarm and stopping movement of said machine if it is determined that there is interference.

25. A method of identifying the position of a moveable portion of a machine tool comprising:

generating signals representing the movement of said moveable portion within a first reference system;

storing said signals as first values for said first reference system as stored counter values;

manually generating a plurality of mathematical expressions via an input keyboard;

storing said plurality of mathematical expressions as stored mathematical expressions;

operating on at least selected said stored counter values to produce, as operation results, second values corresponding to a second reference system, wherein said operation results are produced by using selected ones of said stored counter values as parameters in a selected one of said stored mathematical expressions; and checking for interference by logically processing said second values;

wherein a user is free to manually generate, via said input keyboard, any useful expressions as the plurality of mathematical expressions.

26. The method of claim 25, further comprising issuing an alarm if it is determined that there is interference.

27. The method of claim 25, further comprising displaying an alarm and stopping movement of said machine if it is determined that there is interference.

* * * * *